United States Patent [19]
Montagu

[11] Patent Number: 5,150,249
[45] Date of Patent: * Sep. 22, 1992

[54] TWO-MIRROR SCANNER WITH PINCUSHION ERROR CORRECTION

[75] Inventor: Jean I. Montagu, Brookline, Mass.

[73] Assignee: General Scanning, Inc., Watertown, Mass.

[*] Notice: The portion of the term of this patent subsequent to Sep. 17, 2008 has been disclaimed.

[21] Appl. No.: 743,670

[22] Filed: Aug. 12, 1991

Related U.S. Application Data

[63] Continuation-in-part of Ser. No. 549,228, Jul. 6, 1990, Pat. No. 5,048,904.

[51] Int. Cl.$^5$ .............................................. G02B 26/10
[52] U.S. Cl. ..................................... 359/202; 359/205; 359/221; 250/234
[58] Field of Search ............... 359/201, 202, 206, 213, 359/214, 215, 221, 225; 250/235, 234; 358/206, 444, 474; 346/108

[56] References Cited

U.S. PATENT DOCUMENTS

| | | | |
|---|---|---|---|
| 4,003,626 | 1/1977 | Reinke et al. | 359/202 |
| 4,685,775 | 8/1987 | Goodman et al. | 359/202 |
| 4,714,830 | 12/1987 | Usui | 250/234 |
| 5,048,904 | 9/1991 | Montagu | 359/202 |

*Primary Examiner*—Loha Ben
*Attorney, Agent, or Firm*—Cesari & McKenna

[57] ABSTRACT

A two-dimensional scanner employs first and second pivotable mirrors (36 and 40) to control the position of the target point that a light spot assumes in a target plane (44). The second mirror (40) is driven in a resonant mode. An f·θ lens (42) converts the pincushion error that would otherwise result into a barreling error, which can be compensated for by controlling the amplitude of the second mirror's oscillations.

11 Claims, 2 Drawing Sheets

TWO-MIRROR SCANNER WITH PINCUSHION ERROR CORRECTION

BACKGROUND OF THE INVENTION

This is a continuation in part of U.S. patent application Ser. No. 549,228, which was filed on Jul. 6, 1990 now U.S. Pat. No. 5,048,904, by Jean I. Montagu for a Two-Mirror Scanner with Pincushion Error Correction. The present invention relates to optical scanners and in particular to two-dimensional scanners.

A scanner employs a mirror that receives light from a stationary source and deflects it to cause a resultant moving light spot on a target. (It can also be used reciprocally, to collect light from a moving target spot and direct it to a stationary detector. In most of the description below, only the stationary-source organization will be discussed, but those skilled in the art will recognize that the invention is equally applicable to reciprocal arrangements, as well as to combinations of the two arrangements.

Two-dimensional scanners deflect the light in two (typically orthogonal) directions. Two-dimensional scanning can be achieved by deflecting a single mirror about multiple axes. More typically, however, the deflection is accomplished by pivoting each of two mirrors about respective single axes. The first mirror receives the light from the source. It reflects the light to a second mirror, controlling the position of the target light spot in a first direction. The second mirror receives the light from the first mirror and reflects it toward the target, controlling the position of the light spot in the second, orthogonal direction.

Of particular interest in the present context are two-dimensional scanners employed for raster-scan purposes, i.e., to sweep the target spot repeatedly through a predetermined path in the target plane. The target spot sweeps many times in one direction, which will be called the x direction, during each sweep in the other, y direction. FIG. 1 depicts in schematic form an example of such an arrangement, which is of the type described in U. S. Pat. No. 4,816,920 to Paulsen.

The two-dimensional scanner 10 shown in that drawing deflects light from a source 12 in such a manner as to cause the light to scan across a target plane 14. A lens focuses the light to a narrow target spot on the plane 14, and x and y scanners 18 and 20 produce target-spot deflection in the x and y directions.

One of the advantages of the Paulsen arrangement is that it can scan very rapidly. Clearly, the major limitation on scanning speed in a raster-scan system is the speed at which the x-position mirror can be pivoted; the speed required of the y-position mirror is two or three orders of magnitude lower than that of the x-position mirror, so it does not impose a significant speed limitation. The Paulsen arrangement maximizes the x-mirror speed by taking advantage of the fact that the expected x motion is periodic: it drives the x mirror resonantly, that is, at a frequency equal to or near the natural frequency of the resiliently mounted x mirror. If the Paulsen arrangement drove the x mirror in a mode in which that mirror's angular deflection had to follow a command signal faithfully—as is necessary in non-raster-scan arrangements in which the expected motion is random rather than periodic—then either the achievable speed would be much less or the demands on the drive system would be much greater.

Further contributing the speed capability of the Paulsen arrangement is that the x mirror 18 is located in a part of the light path in which the light beam does not move. A review of the Paulsen-system operation reveals that the light beam downstream of the x mirror 18 moves as the mirrors pivot, as does the spot at which the light beam hits the y mirror 20. The y mirror therefore has to be big enough to accommodate the motion of that spot, and its moment of inertia must therefore be relatively high. For the y mirror 20, which does not have to move very fast, the relatively high moment of inertia is not a problem. The same is not true of the x mirror 18, which has to move two or three orders of magnitude faster; its resonant frequency decreases as its moment of inertia increases, so its size is critical to the overall speed of the system. Its position in a part of the light path in which the light beam does not move is therefore of great importance.

The Paulsen system can easily operate through a wide useful range of mirror deflection angles because of another advantage, namely, that it permits a simple method of "pincushion" correction. The shape of the raster to be produced by repeatedly scanning many times in the x direction during a single scan in the y direction is the rectangle represented by solid lines 22. If the angular amplitude of the y-mirror motion is at all large, however, constant angular amplitudes of the x- and y-mirror motion result in a concave-sided raster whose shape is represented by dashed lines 24.

This distortion, known as pincushion distortion, is a result of an interdependence between the target-spot deflections caused by the two mirrors: unlike the y-direction target-spot position, which depends only on the angular position of the y mirror 20, the x-direction target-spot position depends not only the x mirror's angular position but also on that of the y mirror 20, which is disposed between the x mirror 18 and the target plane 14. In the Paulsen arrangement, one can readily compensate for this interdependence, and therefore permit the use of a significant y-mirror amplitude, by either varying the amplitude of the x-mirror vibration in accordance with the y-mirror position or, in some applications, performing an electronic equivalent by sampling resulting data at a variable rate.

· One of the salient features of the Paulsen arrangement is that it is a post-objective scanner: the scanning mirrors 18 and 20 are disposed between the target plane 22 and the focusing lens ("objective") 16. The focal length of its focusing lens 16 is therefore relatively great, and this tends to result in a significant depth of focus. Although such a depth of focus is desirable in many environments, there are others, such as laser scanning microscopes, in which it is not; in laser scanning microscopes, the beam should depart rapidly from sharp focus in front of and behind the target plane. Applications of that type accordingly require pre-objective arrangements, in which the objective is disposed between the scanning mirrors and the target plane.

Because of the combination of speed and angular amplitude of which the Paulsen arrangement is capable, it would be desirable to adapt its above-described beneficial features to pre-objective scanners. Before the present invention, however, no one had done so satisfactorily, presumably because of an apparent problem associated with objective size.

In a post-objective scanner arrangement of the Paulsen type, the objective is disposed in a stationary part of the light-beam path, so it is not required to be any wider than the light beam. The objective in a pre-objective system, on the other hand, is in a part of the path that moves, so it must be large enough to accommodate the movement. Unfortunately, the objective must typically be a very high-precision lens, and its cost can thus be a significant fraction of the entire system cost. Since the cost of such a lens is roughly proportional to the square of its diameter, it is imperative to locate the objective in a part of the path in which the light-beam motion is as small as possible. In the Paulsen system, however, there is considerable motion of the light beam at any position downstream of the mirrors. Simply taking the objective out of its illustrated position in the Paulsen system and replacing it with an objective located behind the mirrors would therefore be unacceptable for most systems. It is necessary instead to modify the scanner arrangement so as to minimize the path movement immediately downstream of the scanner, where the objective is mounted.

Several existing scanner designs achieve this result. One is the relay arrangement, in which two additional, "relay" lenses are so placed in series between the first and second mirrors that the first and second mirrors are located at the focal points of respective ones of the relay lenses. The angle at which the light beam hits the second mirror thus depends on the angular orientation of the first mirror, but the point at which it hits the second mirror does not. If the objective is positioned as close as possible to the second mirror, therefore, the path movement that it must accommodate is small, so the objective can be small, too. The relay lenses cannot be so small, however, so the relay arrangement ends up being very costly even though it does not require a large objective.

U. S. Pat. No. 4,685,775 to Goodman et al. describes another approach to minimizing objective size. Goodman et al. position a pivotable refracting element (a piece of glass with parallel flat faces) in the light path ahead of the first mirror. Pivoting of the refracting element changes the position, but not the angle, at which the light beam hits the first mirror. By pivoting the refracting element in synchronism with the first mirror, the point at which the light beam hits the objective can be kept stationary. Unfortunately, this approach adds another layer of complexity; a control system has to be provided that will maintain the proper relationship between the angular positions of the refracting element and the first mirror.

I previously proposed a simpler approach to minimizing objective size. In that approach, which FIG. 2 illustrates, the light beam hits the first mirror 18' at a point spaced from the mirror's pivot axis 26. As a consequence, pivoting of the first mirror changes not only the angle at which the light is reflected but also the point from which it is reflected. The first mirror 18' can be so positioned that this movement of the reflection point nearly eliminates movement of the point at which light is reflected from the second mirror 20'.

Despite the simplicity of this approach, it has never been employed heretofore to adapt the beneficial features of the Paulsen arrangement to a pre-objective scanner arrangement. The reason presumably is that this approach requires the first mirror, which is the fast mirror in the Paulsen arrangement, to be relatively large and therefore slow. One might initially have considered the possibility of avoiding this problem by switching the positions of the x and y mirrors, i.e., of making the second mirror the resonant, fast mirror. Before my recognition of the fact upon which this invention is based, however, this would not have appeared to be a real solution if the Paulsen approach to pincushion correction was to be employed. Specifically, if the position of the first mirror still has to be adjusted in accordance with the position of the second, then the motion of the first mirror has to have a significant component at the frequency of the second-mirror vibration, so the size of the first mirror would still effectively limit the speed of the system. Moreover, if the position in the y (slow-scan) direction for a given y-mirror angle depends on the x-mirror angle, the x-direction scans have a curvature for which variable-rate sampling cannot readily compensate.

SUMMARY OF THE INVENTION

The present invention is a pre-objective two-mirror scanner in which the second mirror is the faster (typically resonantly driven) one and the objective is a lens of the type that introduces "barrel" distortion, i.e., distortion that is convex in the sense that pincushion distortion is concave. I have recognized that this barrel distortion reverses the interdependence between the target-spot deflections that the two mirrors cause so that one can compensate for this interdependence by varying the amplitude of the second-mirror vibration in accordance with the position of the first mirror rather than vice versa, as in the Paulsen arrangement. The x mirror can thus be placed in the second position without requiring high-frequency vibration of the first, y mirror, and one can thus adapt the beneficial features of the Paulsen arrangement to pre-objective scanning by simply reversing the positions and functions of the two mirrors. I have therefore achieved a pre-objective two-mirror scanner arrangement that lends itself to the convenient types of pincushion compensation that the Paulsen arrangement does.

BRIEF DESCRIPTION OF THE DRAWINGS

These and further features and advantages of the present invention are described in connection with the accompanying drawings, in which.

DETAILED DESCRIPTION OF ILLUSTRATIVE EMBODIMENT

Figure 1:
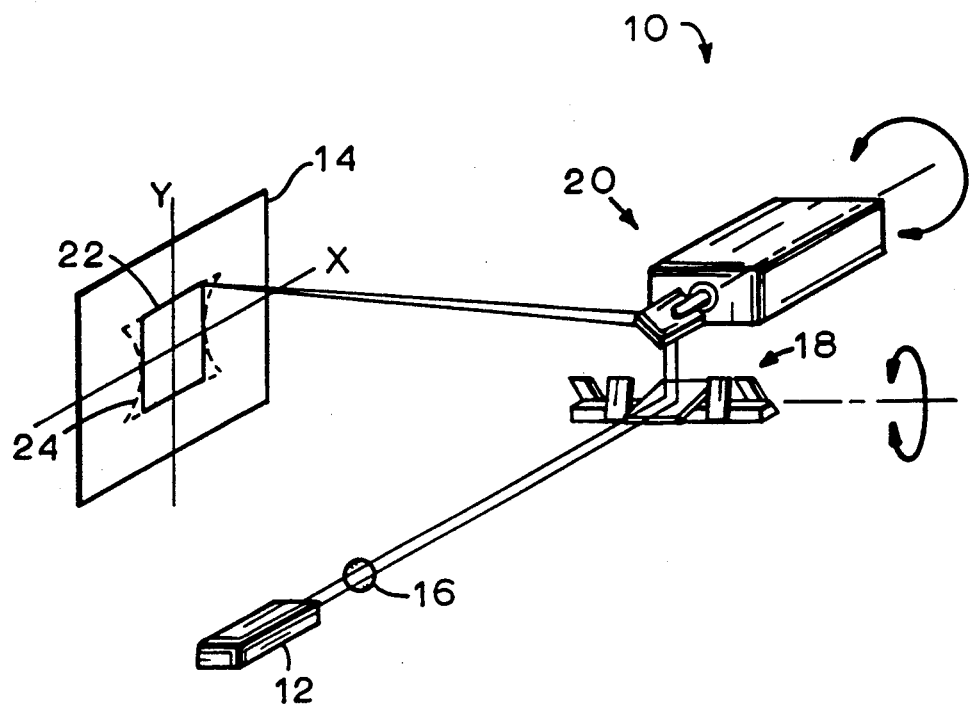
FIG. 1 is a diagram of a prior-art two-mirror scanner.
Figure 2:
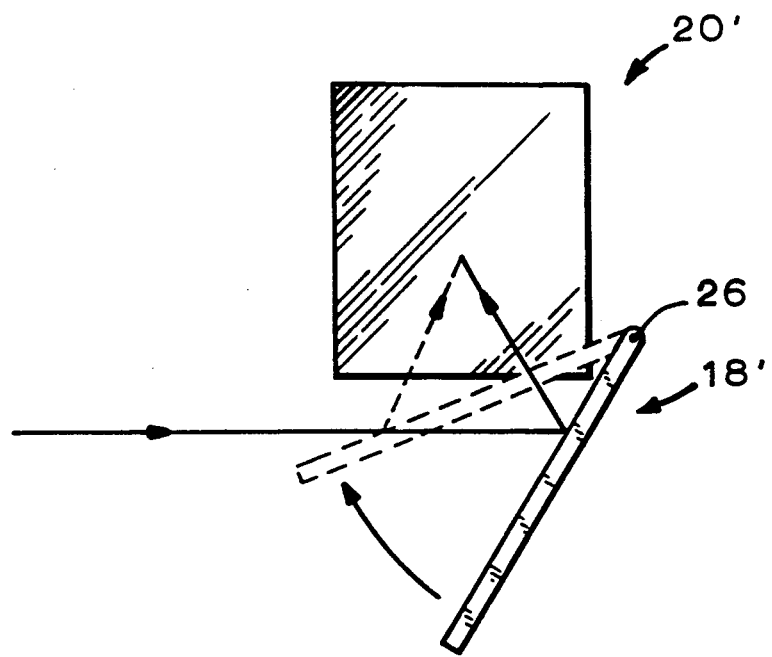
FIG. 2 is a diagram of an alternate mirror-pivoting arrangement employed in the prior art.
Figure 3:
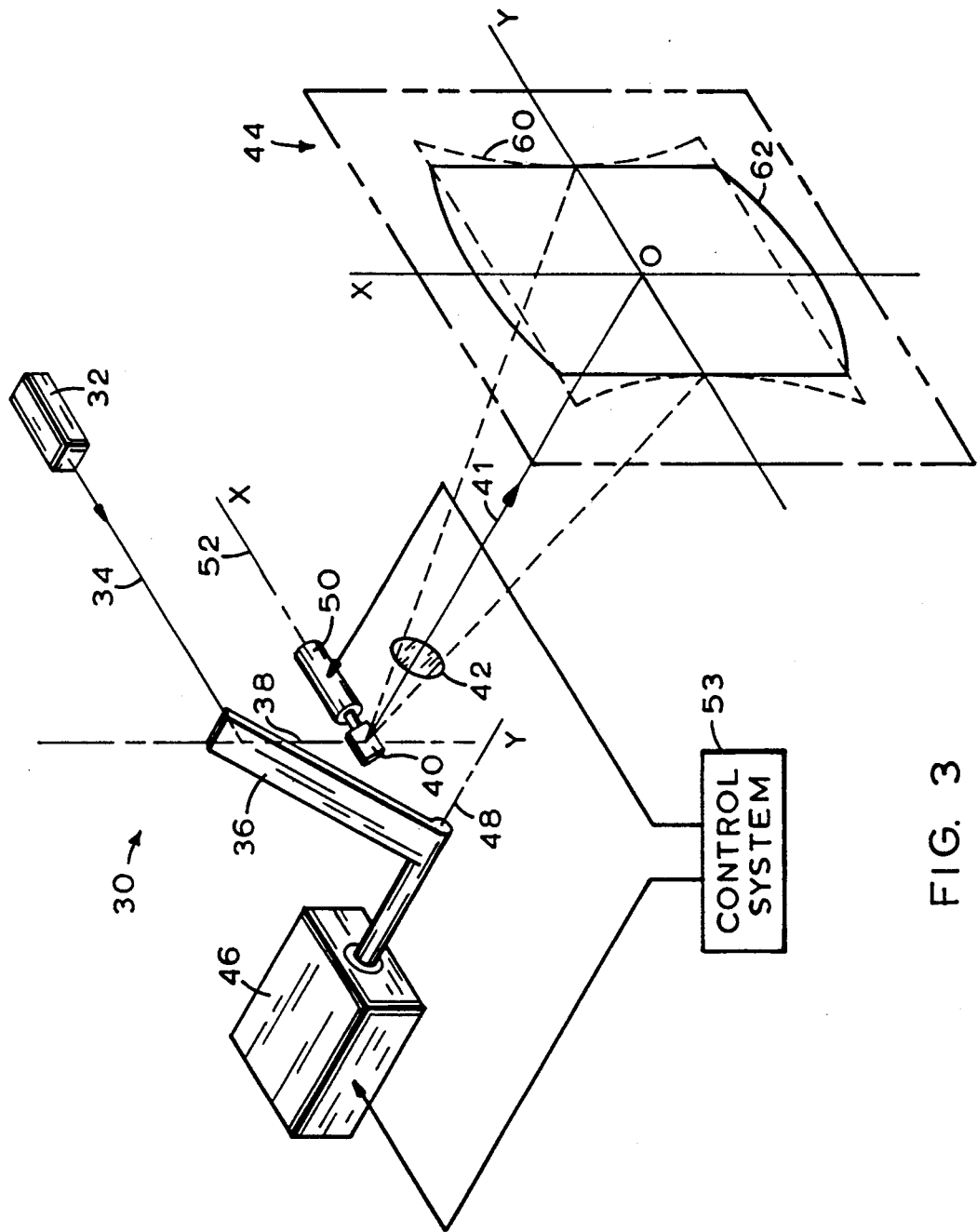
FIG. 3 is a diagram of a two-mirror pre-objective scanner arrangement that employs the teachings of the present invention.

FIG. 3 depicts a two-dimensional scanner 30 in which a stationary light source 32 shines a light beam along a path 34 to a first, y-direction mirror 36, which reflects the light along path 38 to a resonantly driven second, x-direction mirror 40. The second mirror in turn reflects the light along a third path 41 through an f·θ field-flattening lens 42 to a target plane 44 onto which the lens 42 focuses the light.

A galvanometric first, y-direction scanner 46 pivots the first mirror 36 about an axis 48 so as to control the y position of the resulting spot in the target plane 44. A resonant second, x-position scanner 50 pivots the second mirror 40 about an axis 52 to control the x position of the target spot. A control system 53 drives the scanners 46 and 50 in such a manner as to move the light spot in a raster-scan fashion, in which the spot scans several hundred times in the x direction for each scan in the y direction. The second mirror 40 thus oscillates at a frequency at least two orders of magnitude higher than the frequency of the motion of the first mirror 36.

In the illustrated embodiment, the pivot axes 48 and 52 of the mirrors 36 and 40 are so located with respect to the direction of path 34 that the spot at which the light hits the second mirror 40 is nearly stationary. Specifically, the light hits mirror 36 at a point spaced from its pivot axis 48. Consequently, that point moves along mirror 36 as mirror 36 pivots. The movement is just about the right amount to compensate for the changing angle of reflection from the first mirror 36 so that the point at which the light hits the second mirror 40 does not move very much. To achieve this result, the two pivot axes are orthogonal to each other, the initial path 34 of the light beam lies in the same plane as the second pivot axis 52, and the first mirror 36 reflects light at right angles to the second pivot axis 52 when the first mirror is in its rest position.

Because the point that the light hits on mirror 40 does not move very much with movement of mirror 36, the diameter of lens 42 does not need to be much greater than the width of the light beam if the lens is disposed as close as possible to the second mirror 40, which similarly can be kept very small.

The control system 53 drives the second scanner 50 in a resonant mode. Mirror 40 is resiliently mounted: it is rigidly attached to the scanner armature, which can pivot but is biased to a rest position by a spring tension bar, or other resilient member. The spring constant of the resilient member, together with the moment of inertia presented by the combination of the mirror, the armature, and any member secured rigidly to it, determines a natural frequency of the pivoting of mirror 40 about axis 52. The control system 53 drives scanner 50 cyclically at a frequency at or near to that natural frequency. As a consequence, the amplitude and speed of movement of the mirror 40 are much greater than they would be if scanner 50 exerted the same torque at frequencies much higher or, within limits, much lower.

If the lens 42 were not present or were a distortion-free lens rather than an f·θ or other lens that similarly introduces barrel distortion, the positioning of the target spot in plane 44 would be subject to so-called pincushion errors, which dashed lines 60 depict. As was stated above, the pivoting of the first mirror 36 results in motion in the y direction in the target plane 44. For a given deflection of the first mirror 36, however, the resulting position in the target plane 44 depends on the x position that results from the angular orientation of the second mirror 40. Dashed lines 60 represent the outline of the raster that would be scanned by a fixed range of angular motion of the first and second mirrors 36 and 40. Lines 60 show that the range of x deflection is relatively narrow when the second mirror is in its central, i.e., x = 0, position but increases as x gets farther from zero.

Theoretically, one could compensate for this distortion by varying the scan range of the first mirror 36 in accordance with the position of the second mirror 40. Since the second mirror oscillates so fast, however, this is not feasible without increasing the bandwidth requirement of the first-mirror control system to at least equal the frequency of the second-mirror oscillations and without greatly increasing the torque capacity that it is required to have. But I have recognized that one can compensate for pincushion distortion, without using a wide-bandwidth control system for the first mirror 36, by using as the objective a lens that introduces an appropriate amount of barrel distortion.

This is convenient because it turns out that, at least for small deflection-angle ranges, the f·θ lenses commonly used in laser systems to linearize the relationship between target-spot deflection and mirror angle can have this effect, converting the pincushion shape of raster 60 into the barrel shape depicted by solid outline 62, whose vertical edges are now straight, as they should be. That is, the f·θ lens compensates for pincushion distortion.

The spot in the target plane to which a distortionless lens projects light is spaced from the lens's axis of symmetry by a distance proportional to the tangent of the angle from which the light reaches the lens. In contrast, that distance for an f·θ lens is proportional to the angle itself. The degree to which a strict f·θ condition compensates for two-scanner distortion depends on the system's deflection-angle range. Particularly for wide-range systems, therefore, one might actually improve the compensation by intentionally employing a barrel-distortion lens that deviates from a strict f·θ relationship. Readily available f·θ lenses, however, provide correction that is adequate for most purposes.

In compensating for the pincushion error, a lens characterized by barrel distortion imparts a bowed shape to the raster's edges. That is, in compensating for one error, it introduces an error of a different type. But it is easier to compensate for this type of error, because the compensation can be performed by adjusting the amplitude of the oscillations of the fast second mirror 40 in accordance with the angle of the slow first mirror. The bandwidth required of the control system for a resonantly driven second mirror thus is only on the order of twice the oscillation frequency of the first mirror.

Even this bandwidth is not required for certain applications of the present invention. For example, the present invention finds particular application in laser scanning microscopes, in which a short-focal-length lens focuses the scanning beam to a fine point in a sample, and a signal generated from the reflected light is used as the intensity signal for a raster-scan display largely synchronized with the scanner. In such an arrangement, the barreling can be left in the light-beam scan because it can be compensated for by employing a line buffer into which the light-detector samples are loaded. The rate at which the samples are read out of the buffer is constant, corresponding to the scan rate of the display, but the rate at which they are read into the buffer varies in accordance with the y position of the optical scan so as to compensate for the barreling distortion and other factors. This mode of compensation works because each individual fast scan is straight, whereas the fast scans would be hyperbolic if the objective were not an f·θ or similarly compensating lens. The teachings of the present invention are therefore valuable even though the distortion compensation is partly electronic.

Those skilled in the art will also recognize that the present invention is applicable to a reciprocal system, in which the source 32 is replaced with a detector whose output may be used, for instance, as the input to a raster-scan display. Again, the compensation for the barreling distortion could be provided either by varying the amplitude of the fast-scanner oscillations or by an analogous electronic compensation scheme.

The present invention can thus be used in a wide range of applications. It therefore constitutes a significant advance in the art.

I claim:

1. For scanning an object plane, a scanner comprising:
   A) a light source or detector;
   B) a first mirror for reflecting light between (i) a first path extending from the first mirror to the source or detector and (ii) a second path;
   C) a first mirror driver for pivoting the first mirror cyclically about a first pivot axis;
   D) a second mirror, resiliently mounted on a resilient member for pivoting about a second pivot axis so as to exhibit a natural pivoting frequency thereabout, for reflecting light between the second path and a third path that extends to the object plane;
   E) a second mirror driver for cyclically pivoting the second mirror about the second pivot axis through a plurality of cycles for each cycle of pivoting of the first mirror substantially at the natural pivoting frequency, whereby the deflection that the first mirror's pivoting causes in the location at which the third path would reach the object plane in the absence of a lens in the third path depends on the pivot angle of the second mirror and thus would produce pincushion distortion; and
   F) a lens disposed in the third path between the second mirror and the object plane and so characterized by barrel distortion as to reduce the pincushion distortion that would prevail in the absence of the lens.

2. A scanner as defined in claim 1 wherein the intersection of the first path and the second path on the first mirror occurs at a reflection position thereon spaced from the first pivot axis so that the reflection position moves as the first mirror pivots.

3. A scanner as defined in claim 2 wherein the second mirror driver cyclically drives the second mirror with an amplitude that depends on the position of the first mirror.

4. A scanner as defined in claim 2 wherein the source or detector emits light.

5. A scanner as defined in claim 2 wherein:
   A) the second mirror is resiliently mounted on a resilient member so as to exhibit a natural pivoting frequency about the second pivot axis; and
   B) the frequency at which the second mirror driver cyclically pivots the second mirror is substantially the natural pivoting frequency thereof.

6. A scanner as defined in claim 1 wherein the second mirror driver cyclically drives the second mirror with an amplitude that depends on the position of the first mirror.

7. A scanner as defined in claim 6 wherein the source or detector emits light.

8. A scanner as defined in claim 6 wherein:
   A) the second mirror is resiliently mounted on a resilient member so as to exhibit a natural pivoting frequency about the second pivot axis; and
   B) the frequency at which the second mirror driver cyclically pivots the second mirror is substantially the natural pivoting frequency thereof.

9. A scanner as defined in claim 1 wherein the source or detector emits light.

10. A scanner as defined in claim 1 wherein:
    A) the second mirror is resiliently mounted on a resilient member so as to exhibit a natural pivoting frequency about the second pivot axis; and
    B) the frequency at which the second mirror driver cyclically pivots the second mirror is substantially the natural pivoting frequency thereof.

11. A scanner as defined in claim 1 wherein the lens is a field-flattening lens.

* * * * *